United States Patent
Son et al.

(10) Patent No.: US 11,093,056 B2
(45) Date of Patent: Aug. 17, 2021

(54) TOUCH SENSOR, AND WINDOW LAMINATE AND IMAGE DISPLAY DEVICE INCLUDING THE SAME

(71) Applicant: DONGWOO FINE-CHEM CO., LTD., Iksan-si (KR)

(72) Inventors: Dongjin Son, Asan-si (KR);
Duckkyeom Kim, Hwaseong-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 16/938,077

(22) Filed: Jul. 24, 2020

(65) Prior Publication Data
US 2021/0026469 A1    Jan. 28, 2021

(30) Foreign Application Priority Data

Jul. 25, 2019   (KR) .................. 10-2019-0090522
Nov. 15, 2019   (KR) .................. 10-2019-0146646

(51) Int. Cl.
*G06F 3/041*   (2006.01)

(52) U.S. Cl.
CPC .... *G06F 3/041* (2013.01); *G06F 2203/04102* (2013.01)

(58) Field of Classification Search
CPC ............... G06F 3/041; G06F 2203/04102
See application file for complete search history.

(56) References Cited

U.S. PATENT DOCUMENTS

| | | | |
|---|---|---|---|
| 2014/0321072 A1* | 10/2014 | Cavallaro | H05K 1/028 361/749 |
| 2015/0160760 A1 | 6/2015 | Sato | |
| 2018/0307270 A1 | 10/2018 | Pantel | |

FOREIGN PATENT DOCUMENTS

| | | |
|---|---|---|
| JP | 2015-158840 A | 9/2015 |
| KR | 10-2013-0004085 A | 1/2013 |
| KR | 30-0716642 S | 11/2013 |
| KR | 10-2015-0004372 A | 1/2015 |
| KR | 10-2017-0052806 A | 5/2017 |
| KR | 10-2017-0091287 A | 8/2017 |

* cited by examiner

*Primary Examiner* — Charles V Hicks
(74) *Attorney, Agent, or Firm* — Sughrue Mion, PLLC

(57) ABSTRACT

A touch sensor comprises a sensing electrode, a bent part having edges bent rearward at four sides, and a cutout part that is joined after being cut at a vertex of the bent part.

17 Claims, 9 Drawing Sheets

TOUCH SENSOR, AND WINDOW LAMINATE AND IMAGE DISPLAY DEVICE INCLUDING THE SAME

CROSS REFERENCE TO RELATED APPLICATIONS

The instant application claims priority based on Korean Patent Application No. 10-2019-0090522 filed Jul. 25, 2019 and Korean Patent Application No. 10-2019-0146646 filed Nov. 15, 2019, the entire contents of which are hereby incorporated by reference.

TECHNICAL FIELD

The present invention relates to a touch sensor. Particularly, the present invention relates to a touch sensor in which four edges are implemented as display areas.

BACKGROUND ART

A display device is a device that displays information externally, examples of which include a liquid crystal display device, a plasma display panel device, an electroluminescent display device, and an organic light emitting diode display device. The display device includes a touch sensor, which is an apparatus for inputting a user's command by touching contents displayed on the screen with a finger or a pen.

The touch sensor may include a sensing part (a display part) having a plurality of sensing electrodes for sensing touch locations on a substrate, a bezel part (a non-display part) having a trace for transferring touch input signals to an FPCB (Flexible Printed Circuit Board), a bonding pad, and so on.

The sensing electrodes are arranged in directions of X and Y axes and connected with each other, outer ends of which are electrically connected to wires of the trace. The wires may be connected to the FPCB via the bonding pad.

Figure 1:
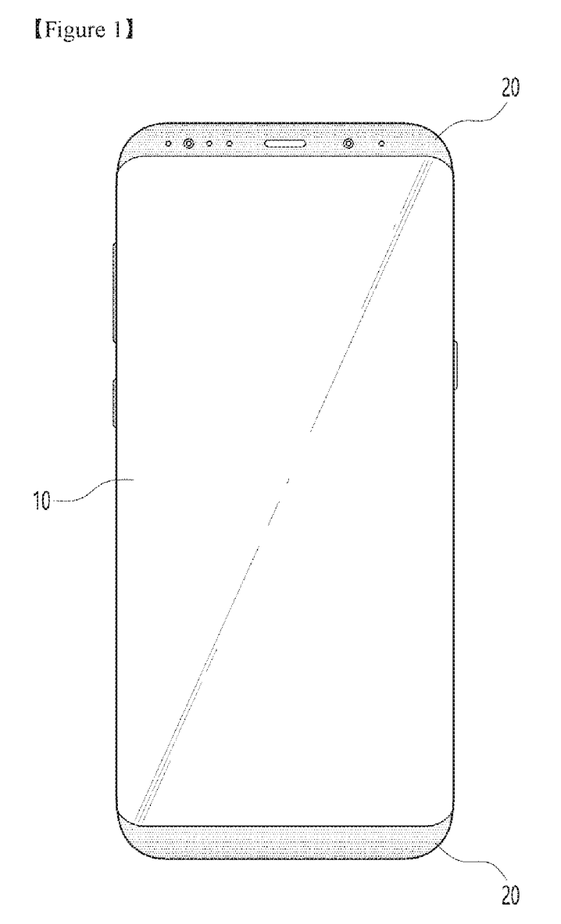
FIG. 1 illustrates a smartphone having a touch sensor according to a prior art.

FIG. 1 illustrates a smartphone having a touch sensor according to a prior art.

As shown in FIG. 1, the prior art smartphone implements a so-called two-edge display in which the left and right edge regions as well as the center region are configured as a display area 10. In this case, the upper and lower edges remain as non-display areas 20.

Recently, there is a growing demand for a smartphone with a so-called four-edge display, rather than the two-edge display, in which the upper and lower edges as well as the left and right edges are configured as the display area. However, the industry has not yet provided a touch sensor capable of implementing the four-edge display.

DISCLOSURE OF INVENTION

Technical Problem

The present invention is to solve the problems of the prior art, and it is intended to provide a touch sensor capable of smooth bending even in a vertex region of a curved edge when implementing a four-edge display.

Technical Solution

A touch sensor of the present invention for achieving the above object may comprise a sensing electrode, a bent part having edges bent rearward at four sides, and a cutout part that may be joined after being cut at a vertex of the bent part.

In the touch sensor of the present invention, the cutout part may be in a form in which a cutout width increases from front to rear, in a cutout state.

In the touch sensor of the present invention, the cutout part may include a first cutout part extending in a first length from the front to the rear and a second cutout part extending in a second length from the first cutout part to the rear, in the cutout state.

In the touch sensor of the present invention, the bent part may include a first bent part extending from the front to the rear while bending with a first bending radius and a second bent part extending from the first bent part to the rear in a straight line or while bending with a second bending radius larger than the first bending radius, in a bending state.

In the touch sensor of the present invention, the first cutout part of the cutout part may be formed in the first bent part, and the second cutout part of the cutout part may be formed in the second bent part.

In the touch sensor of the present invention, the first cutout part and the second cutout part may have a first recessed portion with a first recessed radius and a second recessed portion with a second recessed radius, respectively, at the cutout end.

In the touch sensor of the present invention, the first recessed radius may be smaller than the second recessed radius.

The touch sensor of the present invention may further comprise a first black matrix on a lower surface of the second bent part.

The touch sensor of the present invention may further comprise wiring formed along both edges of the cutout part and an upper non-bending portion of the cutout part.

In the touch sensor of the present invention, the wiring may be formed of a transparent conductive material. As the transparent conductive material, at least one selected from a metal oxide, an oxide/metal/oxide structure laminate, and a metal mesh may be used.

The touch sensor of the present invention may further comprise a second black matrix on a lower surface of the cutout end of the cutout part.

A window laminate according to the present invention may comprise the touch sensor described above and a cover window coupled to the touch sensor.

An image display device according to the present invention may comprise the touch sensor described above and a display panel coupled to the touch sensor.

Advantageous Effects

According to the touch sensor of the present invention having such a configuration, by forming a cutout part that widens toward an end in a vertex region, it is possible to implement a display of a smartphone on upper and lower edges as well as left and right edges.

In addition, according to the touch sensor of the present invention, by configuring the cutout part so that its width grows toward the end and the cutout end becomes recessed when implementing a four-edge display, it can flexibly respond to bending and the degree of bending of the bent part. As a result, it is possible to make the touch sensor bend smoothly in the vertex region of the bent part.

BEST MODE

Hereinafter, the present invention will be described in detail with reference to the accompanying drawings.

Figure 2A:
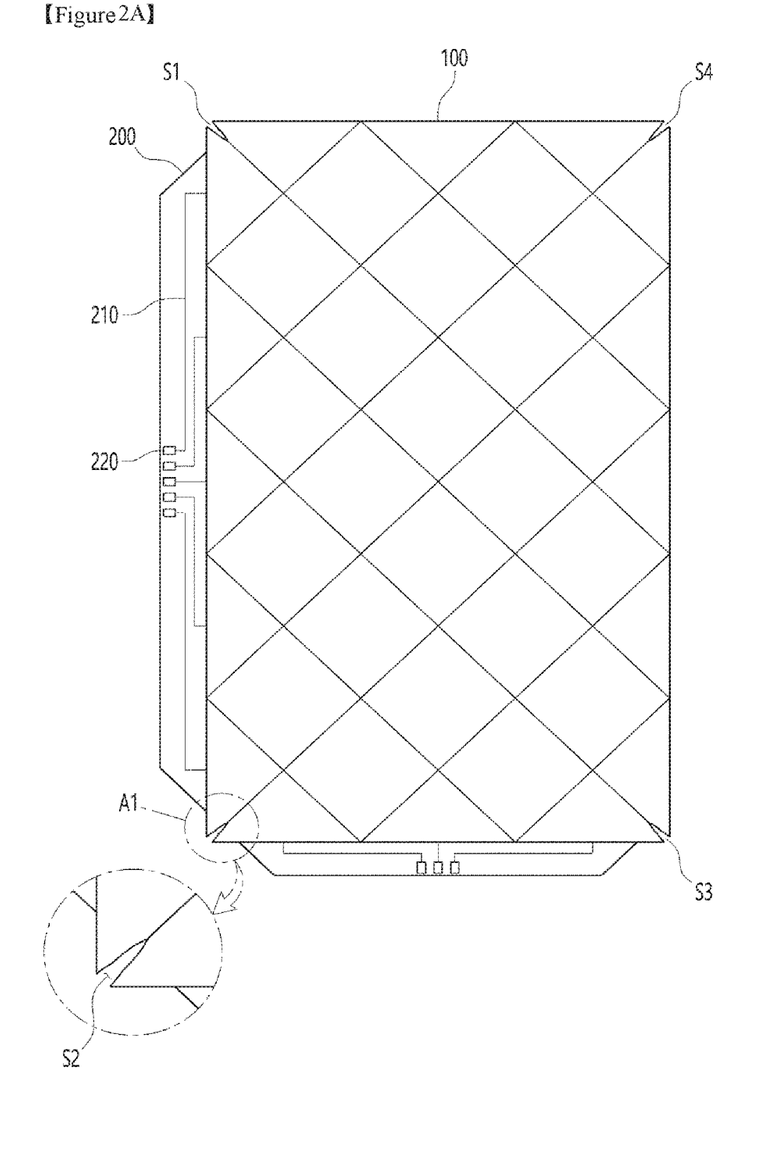
FIG. 2A illustrates a touch sensor according to the present invention in a non-bending (unfolded) state.

FIG. 2A illustrates a touch sensor according to the present invention in a non-bending (unfolded) state.

As shown in FIG. 2A, the touch sensor may comprise a sensing part 100 having a plurality of sensing electrodes, a trace part 200 transferring a touch signal of the sensing part 100 to an FPCB, and so on.

The sensing part 100 may be composed of a separation layer, an electrode layer, an insulation layer, etc., and it may be coupled to a display panel or the like to form a display area.

The separation layer may be an organic polymer film, and may be made of, for example, at least one selected from the group consisting of polyimide, poly vinyl alcohol, polyamic acid, polyamide, polyethylene, polystyrene, polynorbornene phenylmaleimide copolymer, polyazobenzene, polyphenylenephthalamide, polyester, polymethyl methacrylate, polyarylate, cinnamate polymer, coumarin polymer, phthalimidine polymer, chalcone polymer and aromatic acetylene polymer. The separation layer may have a thickness of 10 to 1000 nm, and preferably 50 to 500 nm.

The electrode layer may be formed on the separation layer. The electrode layer may include a sensing electrode that senses whether or not it has been touched. The sensing electrodes may be arranged in directions of X and Y axes and connected with each other. The electrode layer may be a transparent conductive layer, and may be formed of one or more materials selected from metal, metal nanowire, metal oxide, carbon nanotube, graphene, conductive polymer, and conductive ink.

The insulation layer may be formed on the electrode layer. The insulation layer may prevent corrosion of the electrode layer and protect the surface of the electrode layer. The insulation layer can be composed of a curable prepolymer, a curable polymer, a plastic polymer, or the like.

The sensing part 100 may include cutout parts S1 to S4 at vertex regions of the edge. The cutout parts S1 to S4 may be configured in a form in which a cutout width increases from inside to outside, and, for example, they may have a substantially triangular shape.

The sensing part 100 may be bent backward by using a line connecting the inner ends of the cutout parts S1 to S4, that is, a bending starting line (L in FIG. 2B) as a starting point.

The trace part 200 may include a wire 210, a bonding pad 220, and so on, and may form a non-display area when coupled to a display panel or the like.

One side of the wire 210 may be connected to the sensing electrode of the sensing part 100, and the other side may be connected to the bonding pad 220. The wire 210 may be formed of a conductor such as metal, metal nanowire, metal oxide, carbon nanotube, graphene, conductive polymer, conductive ink, etc., and may be formed in a line shape.

The bonding pad 220 may have one side connected to the wire 210 and the other side connected to the FPCB. The bonding pad 220 may be formed of a conductor such as metal, metal nanowire, metal oxide, carbon nanotube, graphene, conductive polymer, conductive ink, etc., and may be formed in a pad shape having a certain area.

Figure 2B:
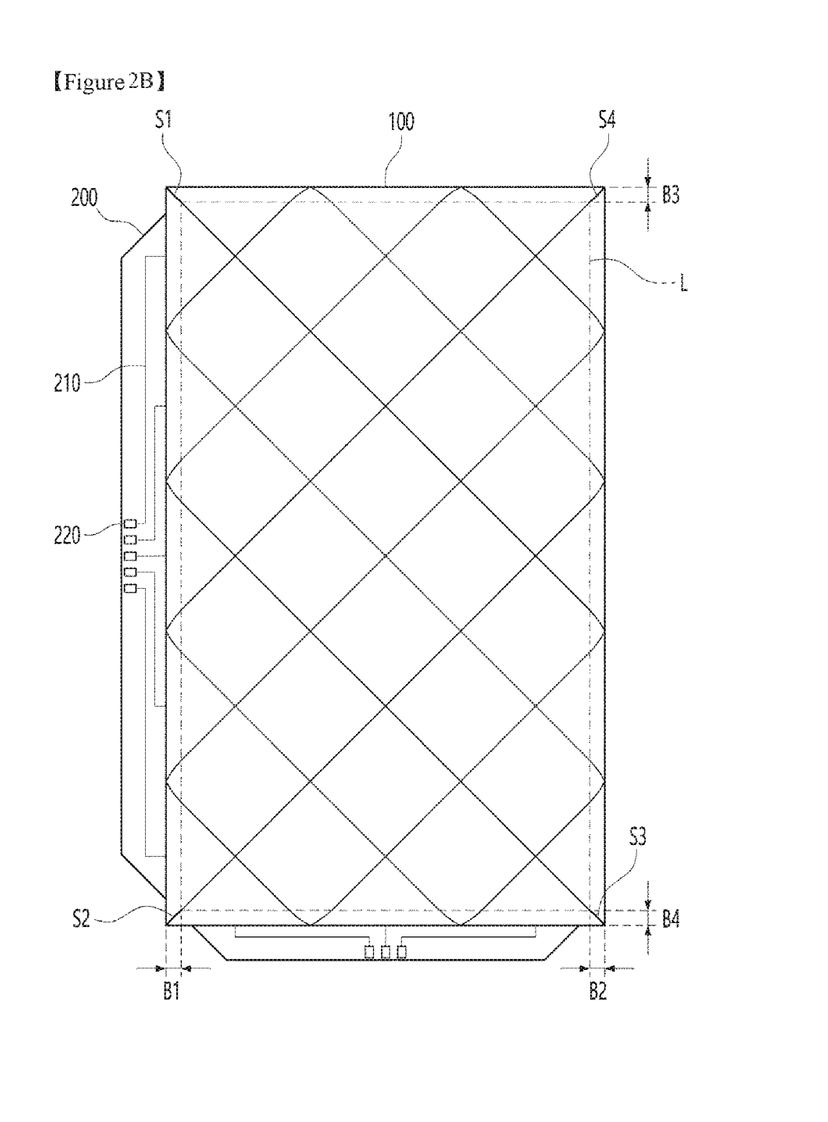
FIG. 2B illustrates a touch sensor according to the present invention in a bending state.

FIG. 2B illustrates a touch sensor according to the present invention in a bending state.

As shown in FIG. 2B, edges of four sides of a sensing part 100 may be bent toward the rear to form bent parts B1 to B4. The bent parts B1 to B4 may be formed on all four sides of the sensing part 100, that is, left/right and top/bottom, and the entire region may serve as a display area.

The bent parts B1 to B4 may be bent with a bending radius of 0.2R or more, preferably a bending radius of 0.3R, starting at the bending starting line L. The bent parts B1 to B4 may have a bending angle of 40 to 80°.

As shown in FIG. 2B, the cutout parts S1 to S4 are formed in the bent parts B1 to B4. When the bent parts B1 to B4 are bent, the cutout ends are brought into contact with each other, thereby closing the cutout parts.

Figure 3A:
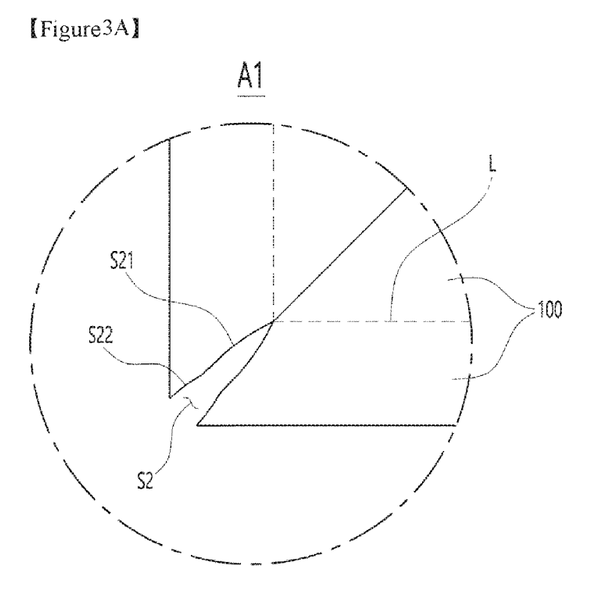
FIG. 3A is an enlarged view showing a vertex region of a touch sensor according to the present invention in an unfolded state.

FIG. 3A is an enlarged view showing a vertex region of a touch sensor according to the present invention in an unfolded state.

As shown in FIG. 3A, a cutout part S2 may be composed of a first cutout part S21 and a second cutout part S22. The first and second cutout parts S21 and S22 may have a shape in which cutout ends are spaced apart in an unfolded state, with the second cutout part S22 being cut wider than the first cutout part S21.

The first cutout part S21 constitutes an upper portion of the cutout part S2 and may be formed by a predetermined length from the bending starting line L. The first cutout part S21 may have a first recessed portion in which the cutout end is recessed inward. The first recessed portion may have a predetermined first recessed radius, and the first recessed radius is adjusted according to a width, a radius of curvature, etc. of the bent parts B1 and B4. Through this, after the bent parts B1 and B4 are bent, the cutout ends are brought into contact with each other in the first cutout part S21 area to make the cutout parts S2 closed.

The second cutout part S22 constitutes a lower portion of the cutout part S2 and may be formed from the rear end of the first cutout part S21 to the rear ends of the bent parts B1 and B4. The second cutout part S22 may have a second recessed portion in which the cutout end is recessed inward, like the first cutout part S21. The second recessed portion may have a predetermined second recessed radius, and the second recessed radius may be adjusted according to the width, the radius of curvature, etc. of the bent parts B1 and B4. The second recessed portion may have a larger recessed radius than that of the first recessed portion of the first cutout part S21. If corresponding areas of the bent parts B1 and B4 are close to a straight line, the second recessed radius may become infinity, that is, it may have a cutout end having a straight line shape.

Figure 3B:
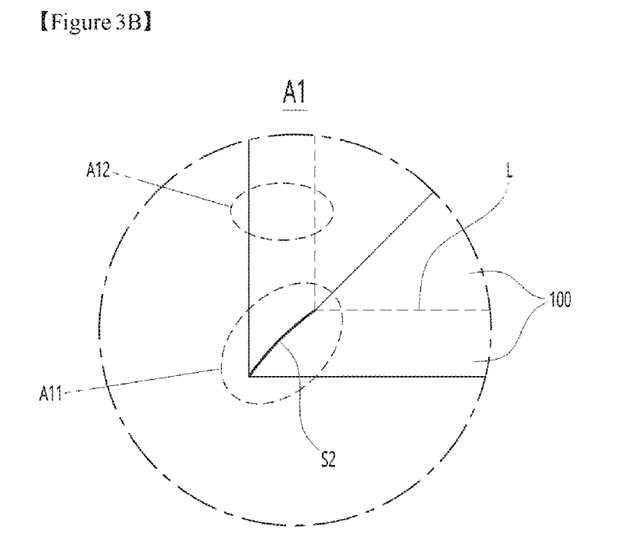
FIG. 3B is an enlarged view showing a vertex region of a touch sensor according to the present invention in a bending state.

FIG. 3B is an enlarged view showing a vertex region of a touch sensor according to the present invention in a bending state.

As shown in FIG. 3B, in a state that the bent parts B1 and B4 are completely bent, the cutout part S2 may be in a state that the cutout ends are joined.

The first cutout part S21 is bent with a small bending radius at an upper side of the bent parts B1 and B4, cutout ends of which are joined. The second cutout part S22 is bent with a large bending radius at a lower side of the bent parts B1 and B4. For example, the cutout ends thereof may be joined in a nearly straight line, that is, without bending.

Figure 3C:
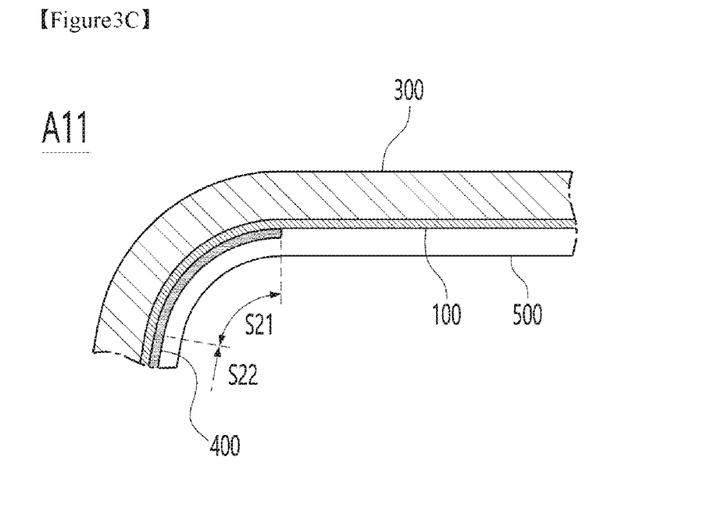
FIG. 3C is a cross-sectional view showing a vertex region of a touch sensor according to the present invention in a bending state.

FIG. 3C is a cross-sectional view showing a vertex region of a touch sensor according to the present invention in a bending state.

As shown in FIG. 3C, in the cutout part S2, a black matrix 400 may be coupled to the rear of a sensing part 100. The black matrix 400 may be coupled in a line shape along the cutout end of the cutout part S2. The black matrix 400 may be formed with a width of 0.5 to 10 mm.

As shown in FIG. 3C, a cover window 300 may be coupled to the front of the sensing part 100, and a base layer 500 may be coupled to the rear of the sensing part 100.

The cover window 300 may be formed of a glass layer, a shock absorbing layer that is coupled to a lower portion of the glass layer, and so on. The glass layer may be chemically strengthened glass, and the shock absorbing layer may be a silicone compound formed on one surface of the glass layer. The glass layer may have a thickness of 5 to 500 μm, and the shock absorbing layer may have a thickness of 50 nm to 5 μm.

The base layer 500 may be a polarizer, a polarizing plate, a retardation film, a reflective sheet, a brightness enhancing film, a refractive index matching film, or the like.

Figure 3D:
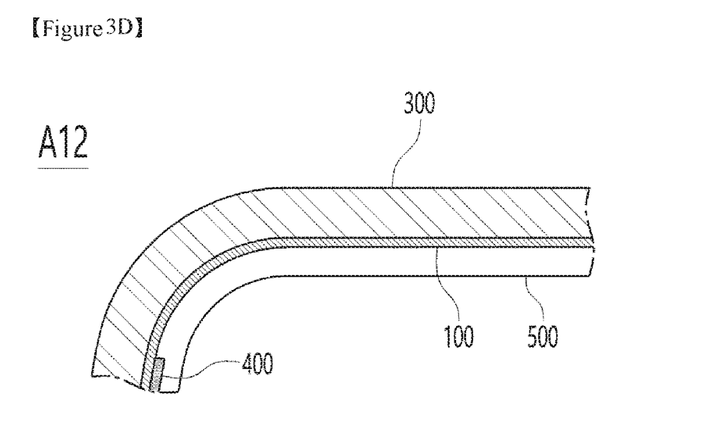
FIG. 3D is a cross-sectional view showing an edge region of a touch sensor according to the present invention in a bending state.

FIG. 3D is a cross-sectional view showing an edge region of a touch sensor according to the present invention in a bending state.

As shown in FIG. 3D, a black matrix 400 may be coupled to the rear of a sensing part 100 along rear ends of the bent parts B1 to B4. The black matrix 400 may be formed in a line shape. The black matrix 400 may be formed to have a same width as that of the second cutout part S22. The black matrix 400 may be formed with a width of 0.5 to 10 mm.

In the case of FIG. 3D, the black matrix 400 may be formed on both the rear ends of the bent parts B1 to B4 and the cutout parts S1 to S4. Alternatively, it may not be formed on the cutout parts S1 to S4, but it may be formed only at the rear ends of the bent parts B1 to B4.

Figure 4A:
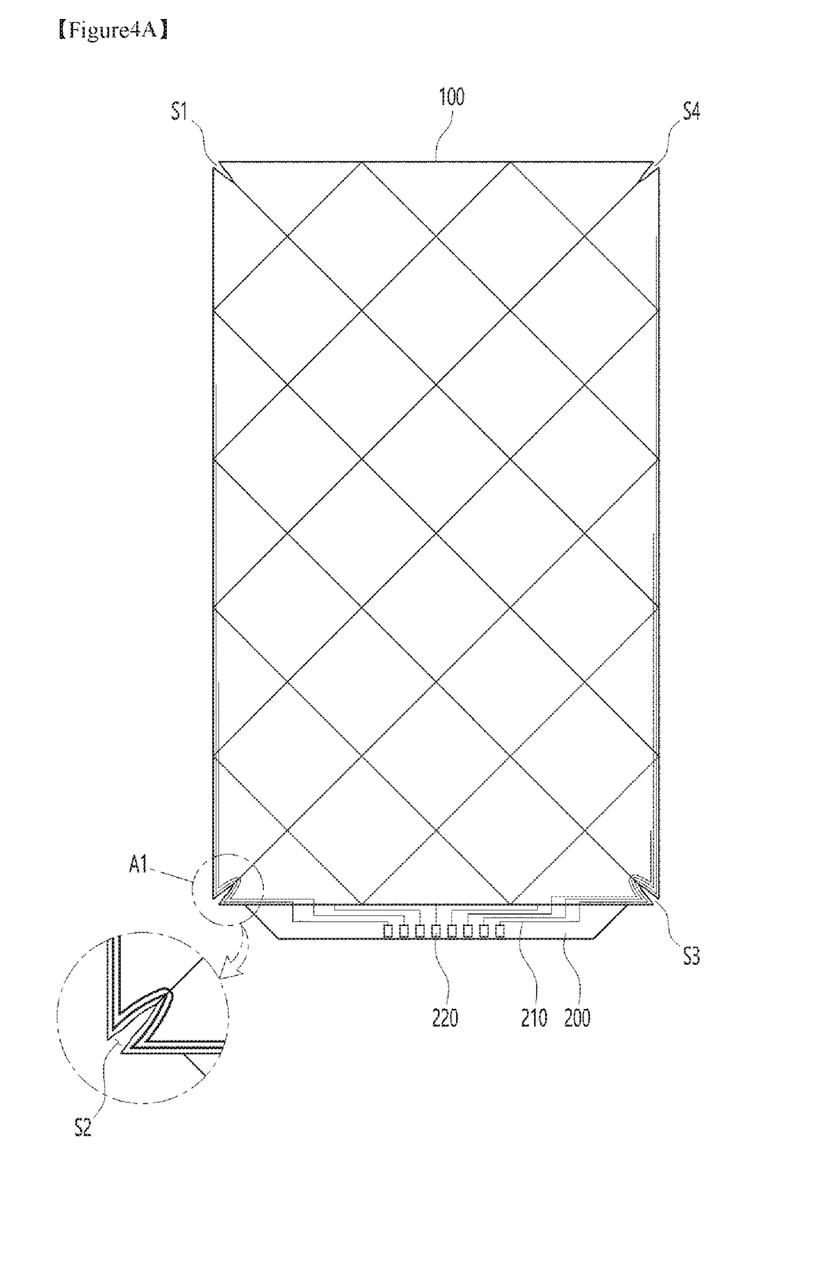
FIG. 4A illustrates a touch sensor in which wiring is formed at an edge of a sensing part according to the present invention in a non-bending (unfolded) state.
Figure 4B:
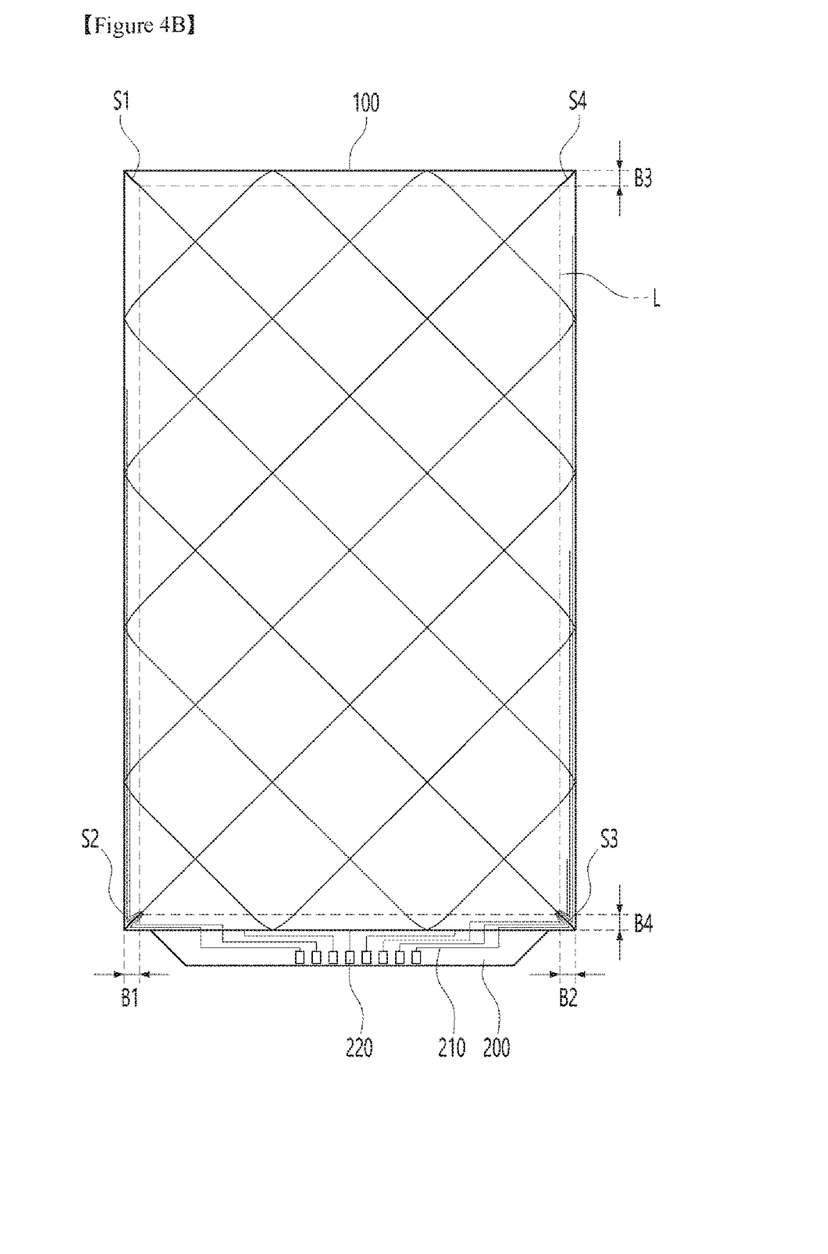
FIG. 4B illustrates a touch sensor in which wiring is formed at an edge of a sensing part according to the present invention in a bending state.

FIGS. 4A and 4B illustrate a touch sensor in which wiring is formed at an edge of a sensing part according to the present invention in a non-bending (unfolded) state and a bending state, respectively.

As shown in FIGS. 4A and 4B, a wire 210 may be formed along the edge of the sensing part 100. In this case, the wire 210 may be formed along both edges of the cutout parts S2 and S3 and the upper non-bending portions of the cutout parts S2 and S3 in the cutout parts S2 and S3 region. The wire 210 may be formed on an insulation layer and connected to an electrode layer through a contact penetrating the insulation layer.

As in FIGS. 4A and 4B, when the wire 210 is formed on the edge of the sensing part 100, the wire 210 may be made of a transparent conductive material to secure visibility. As the transparent conductive material, a metal oxide, an oxide/metal/oxide structure laminate, a metal mesh, etc. may be used, and these may be used alone or in combination of two or more.

Since the rest of the configuration of FIGS. 4A and 4B is the same as the corresponding configuration of FIGS. 2A and 2B, detailed description of the rest of the configuration is replaced by the relevant description of FIGS. 2A and 2B.

Figure 5A:
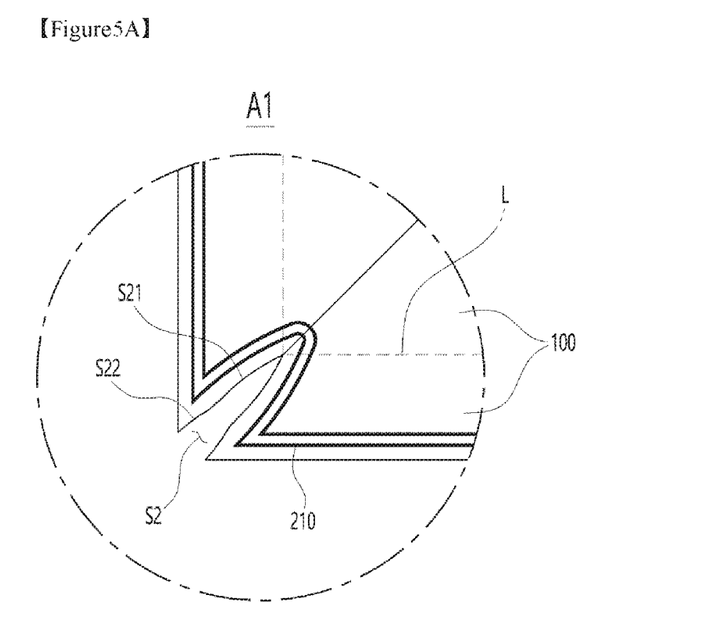
FIG. 5A is an enlarged view showing a vertex region of a touch sensor in which wiring is formed at an edge of a sensing part according to the present invention in an unfolded state.
Figure 5B:
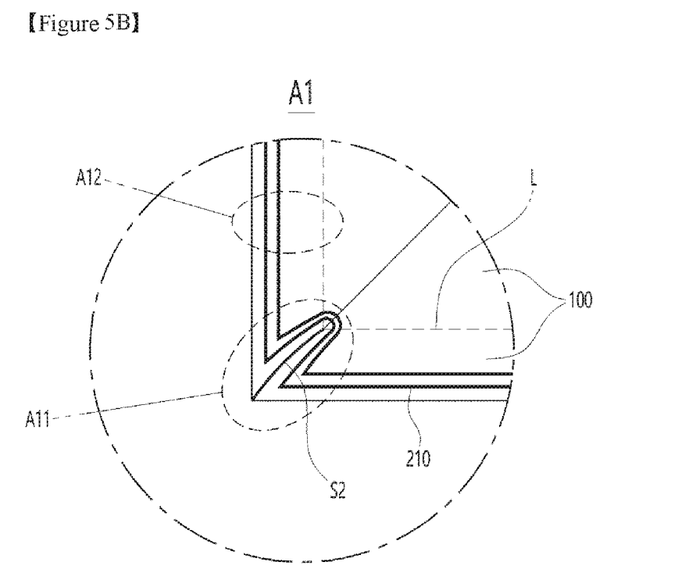
FIG. 5B is an enlarged view showing a vertex region of a touch sensor in which wiring is formed at an edge of a sensing part according to the present invention in a bending state.

FIGS. 5A and 5B are enlarged views showing a vertex region of a touch sensor in which wiring is formed at an edge of a sensing part according to the present invention in an unfolded state and a bending state, respectively.

As shown in FIGS. 5A and 5B, a wire 210 may be formed to be arranged along the edge of the cutout part S2 that is bent and the upper non-bending portion of the cutout part S2 that is not bent.

An image display device according to the present invention may include a touch sensor described above and a display panel coupled to one side of the touch sensor. The display panel may be a liquid crystal display panel, a plasma display panel, an electroluminescent display panel, an organic light emitting diode display panel, or the like.

In the above, the present invention has been described through various embodiments, which are intended to illustrate the present invention. Those skilled in the art will be able to modify or revise these embodiments in other forms. However, since the scope of the present invention is defined by the claims below, it can be interpreted that such modifications or revisions are included in the scope of the present invention.

DESCRIPTION OF REFERENCE NUMERALS

| | |
|---|---|
| 10: display area | 20: non-display area |
| 100: sensing part | 200: trace part |
| 210: wire | 220: bonding pad |
| 300: cover window | 400: black matrix |
| 500: base layer | B1~B4: bent parts |
| L: bending starting line | S1~S4: cutout parts |
| S21: first cutout part | S22: second cutout part |

The invention claimed is:

1. A touch sensor comprising:
a sensing electrode;
a bent part having edges bent rearward at four sides; and
a cutout part that is joined after being cut at a vertex of the bent part.

2. The touch sensor according to claim 1, wherein a cutout width of the cutout part increases from front to rear, in a cutout state.

3. The touch sensor according to claim 2, wherein the cutout part includes a first cutout part extending in a first length from the front to the rear and a second cutout part extending in a second length from the first cutout part to the rear, in the cutout state.

4. The touch sensor according to claim 3, wherein:
the bent part includes a first bent part extending from the front to the rear while bending with a first bending radius and a second bent part extending from the first bent part to the rear in a straight line or while bending with a second bending radius larger than the first bending radius, in a bending state; and the first cutout part is formed in the first bent part and the second cutout part is formed in the second bent part.

5. The touch sensor according to claim 4, wherein the first cutout part and the second cutout part have a first recessed portion with a first recessed radius and a second recessed portion with a second recessed radius, respectively, at the cutout end.

6. The touch sensor according to claim 5, wherein the first recessed radius is smaller than the second recessed radius.

7. The touch sensor according to claim 4, further comprising a first black matrix on a lower surface of the second bent part.

8. The touch sensor according to claim 7, further comprising a second black matrix on a lower surface of the cutout end of the cutout part.

9. The touch sensor according to claim 1, further comprising wiring formed along both edges of the cutout part and an upper non-bending portion of the cutout part.

10. The touch sensor according to claim 9, wherein the wiring is formed of a transparent conductive material.

11. The touch sensor according to claim 10, wherein the wiring uses at least one selected from a metal oxide, an oxide/metal/oxide structure laminate, and a metal mesh.

12. A window laminate comprising:
a cover window; and
the touch sensor according to claim 1 coupled to the cover window.

13. An image display device comprising:
a display panel; and
the touch sensor according to claim 1 coupled to the display panel.

14. The touch sensor according to claim 5, further comprising a first black matrix on a lower surface of the second bent part.

15. The touch sensor according to claim 14, further comprising a second black matrix on a lower surface of the cutout end of the cutout part.

16. The touch sensor according to claim 6, further comprising a first black matrix on a lower surface of the second bent part.

17. The touch sensor according to claim 16, further comprising a second black matrix on a lower surface of the cutout end of the cutout part.

* * * * *